United States Patent
Chen et al.

(10) Patent No.: US 8,158,211 B2
(45) Date of Patent: Apr. 17, 2012

(54) ANTI-REFLECTION PLATE AND METHOD FOR MANUFACTURING ANTI-REFLECTION STRUCTURE THEREOF

(75) Inventors: Chih-Wei Chen, Taipei County (TW); Chin-Jyi Wu, Hsinchu County (TW); Wen-Tzong Hsieh, Taichung County (TW); Wen-Tung Hsu, Hsinchu County (TW); Chun-Hung Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 783 days.

(21) Appl. No.: 12/343,540

(22) Filed: Dec. 24, 2008

(65) Prior Publication Data

US 2009/0169822 A1    Jul. 2, 2009

(30) Foreign Application Priority Data

Dec. 27, 2007 (TW) ................. 96150625 A
Dec. 17, 2008 (TW) ................. 97149294 A (51) Int. Cl.
*H05H 1/00* (2006.01)
*C23C 4/00* (2006.01)

(52) U.S. Cl. ........ 427/446; 427/447; 427/448; 427/569; 427/570

(58) Field of Classification Search ................. 427/446, 427/447, 448, 569, 570
See application file for complete search history.

(56) References Cited

U.S. PATENT DOCUMENTS

| 4,425,022 A | 1/1984 | Ludwig |
| 2006/0172119 A1 | 8/2006 | Hayashi et al. |

FOREIGN PATENT DOCUMENTS

| CN | 1826541 | 8/2006 |
| DE | 2921178 | 11/1980 |
| JP | 11061406 | 3/1999 |
| JP | 2004107690 | 4/2004 |
| JP | 2006-299000 | * 2/2006 |
| JP | 2006-299000 | 11/2006 |
| JP | 2006-343758 | 12/2006 |

OTHER PUBLICATIONS

English language translation of abstract of CN 1826541 (published Aug. 30, 2006).
Japanese language office action dated Mar. 1, 2011.
English language translation of office action.
English language translation of JP 2006-299000 (published Nov. 2, 2006).
English language translation of JP 2006-343758 (published Dec. 21, 2006).

* cited by examiner

*Primary Examiner* — Eisa Elhilo
(74) *Attorney, Agent, or Firm* — Thomas|Kayden (57) ABSTRACT

A method for manufacturing an anti-reflection structure is provided. The method includes the following steps: First, a to-be-treated object is provided in a reactive area. Next, a plasma source is provided in the reactive area. Then, the plasma source is ionized to form plasma in atmospheric pressure. Next, the surface of the to-be-treated object is treated by plasma so as to form a plurality of micro-protuberances on the surface of the to-be-treated object.

34 Claims, 10 Drawing Sheets

FIG. 11

ANTI-REFLECTION PLATE AND METHOD FOR MANUFACTURING ANTI-REFLECTION STRUCTURE THEREOF

This application claims the benefits of Taiwan applications Serial No. 96150625, filed Dec. 27, 2007 and Serial No. 97149294, filed Dec. 17, 2008, the subject matter of which is incorporated herein by reference.

BACKGROUND OF THE INVENTION

1. Field of the Invention

The invention relates in general to an anti-reflection plate and a method for manufacturing an anti-reflection structure thereof, and more particularly to an anti-reflection plate with an anti-reflection structure having nanometer level micro-protuberances and a manufacturing method thereof.

2. Description of the Related Art

Anti-reflection technology has a wide range of application such as glasses, disc surface, the display surfaces of TV, computer monitor, digital camera, PDA, GPS and mobile phone, windshield, and the panel surface of airplane and vehicle, as well as show window and biomedical application. After the treatment according to the anti-reflection technology, glare or ghosting which occurs when the surface of an object reflects an external light source will be reduced, and the surface of solar collector is further used for increasing the utilization of light energy. Thus, the image display quality and the utilization rate of light energy will be significantly improved.

The current anti-reflection technology is to form several layers of thin films with different refractive indexes on substrate surface to reduce reflectance. As the current thin film manufacturing process needs to perform coating process in a vacuum environment, the manufacturing process becomes very time-consuming and costive. Furthermore, the yield rate of multi-layered thin film is very hard to control, making the products using anti-reflection technology very expensive and difficult to become popular.

SUMMARY OF THE INVENTION

The invention is directed to an anti-reflection plate and a method for manufacturing an anti-reflection structure thereof. The anti-reflection structure is formed by atmospheric pressure plasma, largely reducing the material, time and cost required for manufacturing the anti-reflection plate.

According to a first aspect of the present invention, a method for manufacturing an anti-reflection structure is provided. The method includes the following steps: First, a to-be-treated object is provided in a reactive area. Next, a plasma source is provided in the reactive area. Then, the plasma source is ionized to form plasma in atmospheric pressure. Next, the surface of the to-be-treated object is treated by plasma so as to form a plurality of micro-protuberances on the surface of the to-be-treated object.

According to a second aspect of the present invention, a method for manufacturing an anti-reflection structure is provided. The method includes the following steps. First, a to-be-coated object is provided in a reactive area. Next, the plasma source is provided in the reactive area. Then, a coating monomer is provided in the reactive area. Next, the plasma source is ionized to form plasma in atmospheric pressure for enabling the plasma to react with the coating monomer. Then, the coating monomer is deposited on the surface of the to-be-coated object to form a thin film having a plurality of micro-protuberances.

According to a third aspect of the present invention, an anti-reflection plate having an incident plane is provided. The anti-reflection plate includes a plurality of micro-protuberances disposed on the incident plane. The mean width of individual micro-protuberance is within a range from 10 nm to 500 nm.

The invention will become apparent from the following detailed description of the preferred but non-limiting embodiments. The following description is made with reference to the accompanying drawings.

DETAILED DESCRIPTION OF THE INVENTION

Atmospheric pressure plasma (APP) is the plasma generated in or approximate to an atmospheric pressure. Compared to the conventional vacuum plasma technology, the atmospheric plasma system is advantageous in terms of cost because no expensive and heavy vacuum device is required. In terms of the manufacturing process, the elements are not subjected to the restriction of the vacuum chamber, and thus are applicable to a continuous large-scale production. These technologies are capable of effectively reducing manufacturing cost.

When the light is projected on a material, a part of the light will be reflected no matter the material is transparent or not. Such reflection occurs when the refractive index at the interface between two transmission mediums changes sharply.

According to the anti-reflection technologies disclosed in the embodiments of the invention, a bionic moth eye structure is formed by atmospheric pressure plasma. As the cornea surface of the moth eye has micro-protuberances, the dimension of the repeating pattern is smaller than the wavelength of the light. When the dimension is smaller than optical wavelength, the optical wave will not recognize the micro structure, so that the refractive index observed on the surface will change gradually along the depth direction. Therefore, the reflection resulted due to dramatic change in the refractive index at the interface between two transmission medium will be reduced. The two embodiments of the invention forming periodic nanometer level micro-protuberances similar to the moth eye are capable of largely reducing the reflectance on the surface of an object. The way of forming the anti-reflection structure of the invention is elaborated in the following embodiments.

First Embodiment

Figure 1:
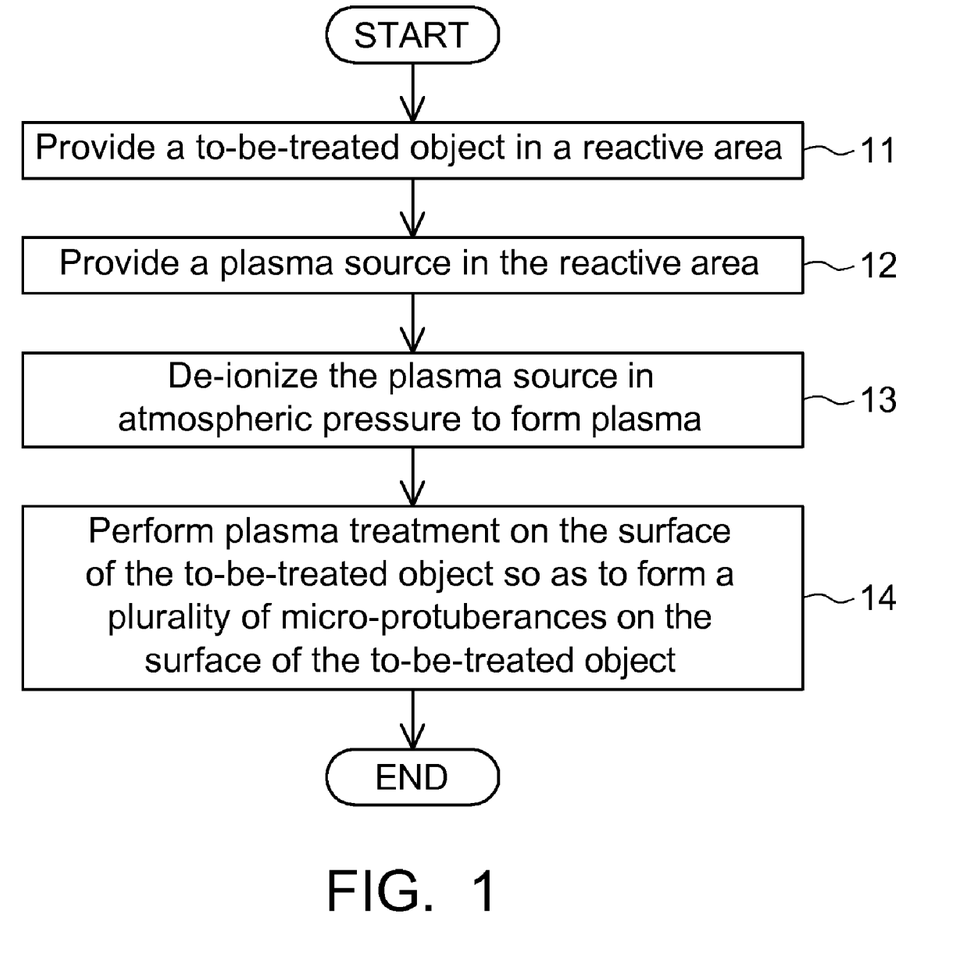
FIG. 1 is a flowchart of a forming process of an anti-reflection plate according to a first embodiment of the invention.

Referring to FIG. 1, a flowchart of a forming process of an anti-reflection plate according to a first embodiment of the invention is shown. Also, referring to FIG. 2A, a diagram of a to-be-treated object and an atmospheric plasma device is shown. First, as indicated in step 11, a to-be-treated object 100 is provided in a reactive area 6, wherein the to-be-treated object 100 exposing a surface 101 is placed on a platform 5 and under a plasma gun 2. In the present embodiment of the invention, the to-be-treated object 100 is exemplified by a substrate. The material of the to-be-treated object 100 can use glass or polymethyl methacrylate (PMMA), and the to-be-treated object 100 can be used as the housing of display or the show window. Or the to-be-treated object 100 also can be the silicon wafer for manufacturing a solar collector.

Next, as indicated in step 12, a plasma source is provided in the reactive area 6. The plasma source is at least one of inert gas, air, nitrogen, oxygen, chlorofluorocarbon (CFC) compound gas and hydrocarbon compounds gas. Examples of inert gas include helium, neon, argon, and krypton. The air is exemplified by clean dry air (CDA). Chlorofluorocarbon (CFC) compound gas is exemplified by carbon tetrafluoride ($CF_4$). Hydrocarbon compound gas is exemplified by acetylene ($C_2H_2$).

Figure 2A:
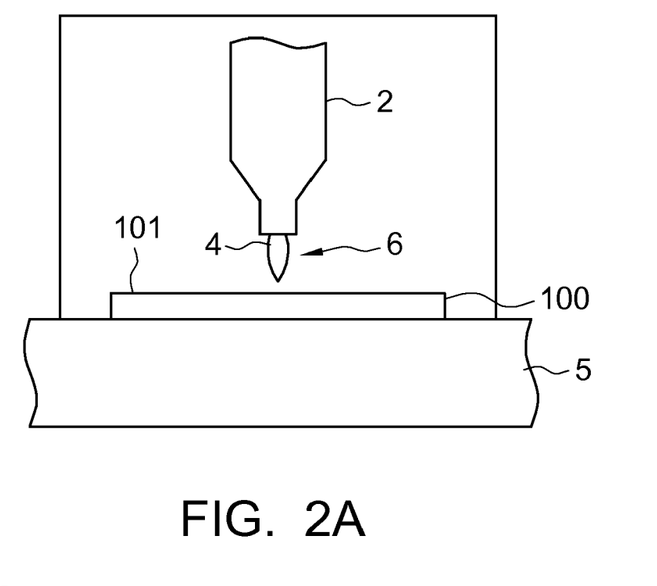
FIG. 2A is a diagram of a to-be-treated object and an atmospheric plasma device.

Furthermore, the technology of the invention is not limited thereto. During the course of processing the surface of the to-be-treated object 100, the gas used as the plasma source can go with the to-be-treated object 100 to achieve better effect. For example, if the material of the to-be-treated object 100 is glass or silicon wafer, preferably argon is used as a plasma source. If the material of the to-be-treated object 100 is PMMA, the plasma source preferably uses a mixed gas of nitrogen ($N_2$) and carbon tetrafluoride ($CF_4$).

Then, as indicated in step 13, the pressure in the reactive area 6 is maintained in an atmospheric pressure, which is around 760 torr. An electrical field is applied in the plasma gun 2 for enabling the gas used as a plasma source to be de-ionized and jetted to form the plasma 4. However, the technology of the invention is not limited thereto. When the pressure in the reactive area 6 is maintained between 100-760 torr, the same effect of the invention still can be achieved.

Next, as indicated in step 14, the surface of the substrate of the to-be-treated object 100 is treated by the plasma 4. As the pressure in the reactive area 6 is approximately maintained in an atmospheric pressure, the ion concentration of the plasma generated in the reactive area 6 is higher than that generated in a low-pressure environment. Therefore, the ion bombardment, heating effect and etching effect generated by the atmospheric pressure plasma are intensified, and uniformed micro-protuberances can thus be formed on the surface 101 of the to-be-treated object 100.

The steps 11-14 of the present embodiment of the invention are preferably performed in an atmospheric pressure plasma system and the sequence of the steps is not limited. The atmospheric pressure plasma system can generate at least one of the following types of plasma such as atmospheric pressure plasma glow discharge, atmospheric pressure jet plasma, atmospheric pressure plasma torch, atmospheric pressure surface dielectric barrier discharge.

Figure 2B:
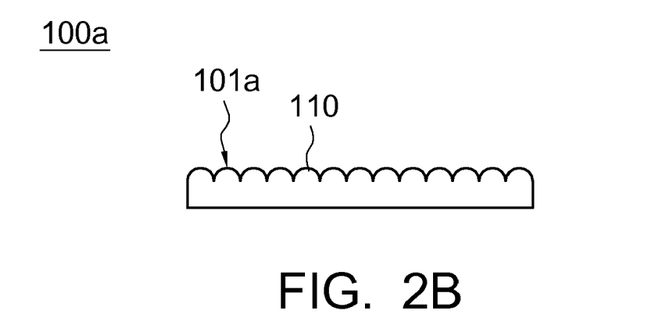
FIG. 2B is a diagram of an anti-reflection plate after atmospheric pressure plasma treatment.
Figure 2C:
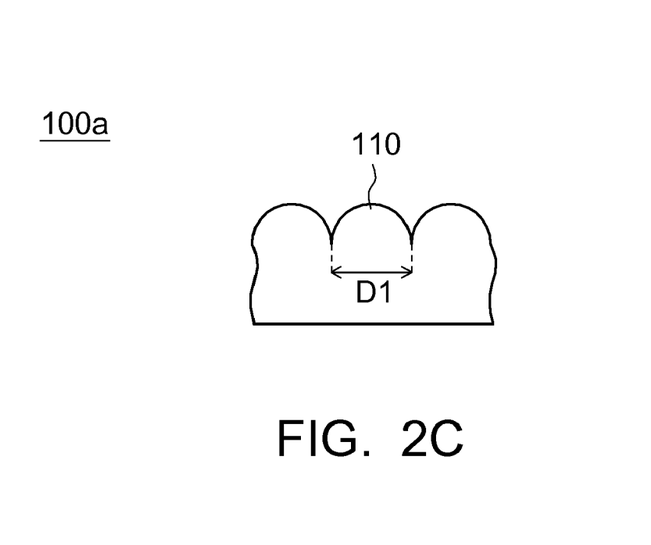
FIG. 2C is a partial enlargement of the anti-reflection plate of FIG. 2B.

Referring to FIG. 2B, a diagram of the anti-reflection plate after atmospheric pressure plasma treatment is shown. After an anti-reflection plate 100a is treated, an incident plane 101a has many periodic nanometer level micro-protuberances 110. Referring to FIG. 2C, a partial enlargement of the anti-reflection plate of FIG. 2B is shown. Preferably, the average width D1 of the micro-protuberances 110 is within a range from 10 nm - to 500 nm, and the roughness of the micro-protuberances 110 relative to the surface 101a of the anti-reflection plate 100a is smaller than 100 nm. In the present embodiment of the invention, roughness is measured by atomic force microscopy (AFM).

Figure 3A:
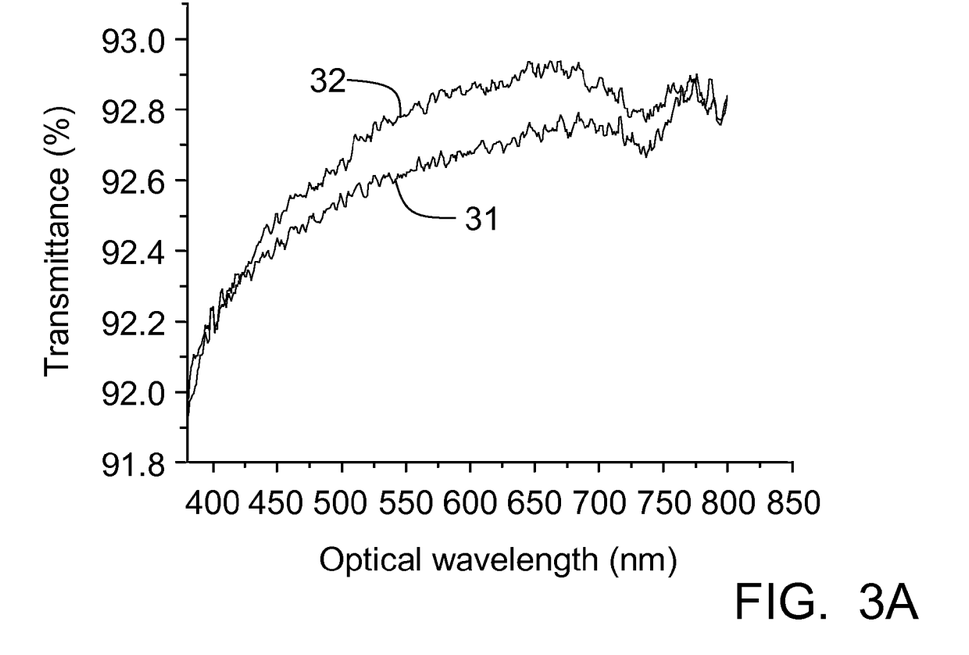
FIG. 3A is a comparison diagram of the transmittance of a PMMA substrate under different optical wavelengths before and after plasma treatment.

Referring to FIG. 3A, a comparison diagram of the transmittance of a PMMA substrate under different optical wavelengths before and after plasma treatment is shown. As indicated in FIG. 3A, the curve 31 is a transmittance curve of a PMMA substrate before plasma treatment, and the curve 32 is a transmittance curve of a PMMA substrate after plasma treatment. As indicated in FIG. 3A, the transmittance of a PMMA substrate within the optical wavelength of 450 nm-750 nm is significantly improved after plasma treatment.

Figure 3B:
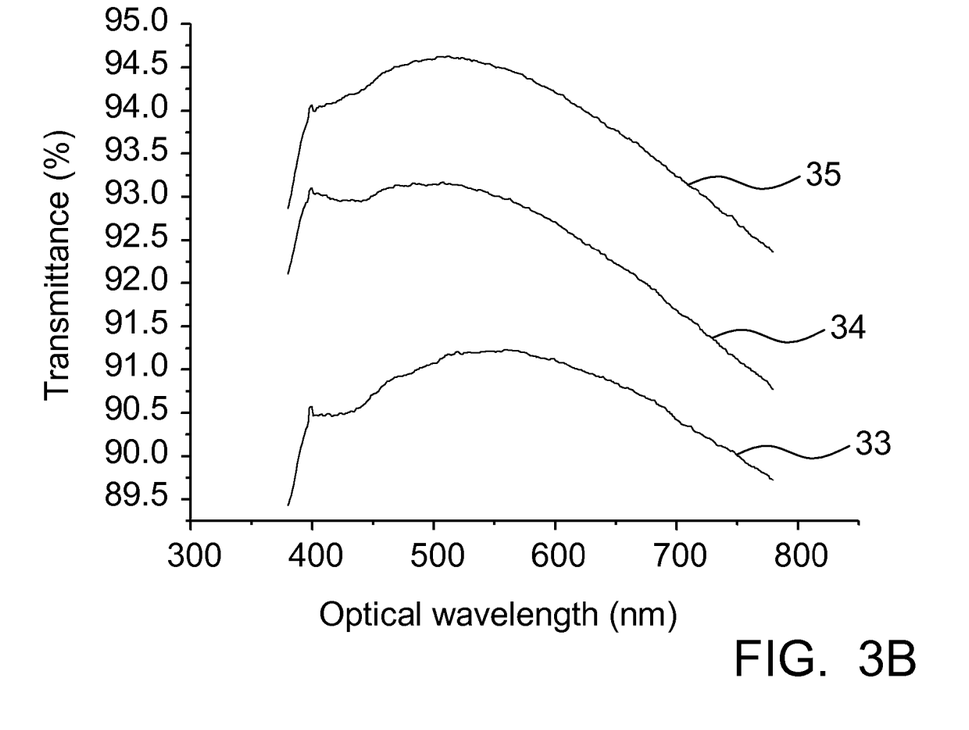
FIG. 3B is a comparison diagram of the transmittance of a glass substrate under different optical wavelengths before and after plasma treatment.

Referring to FIG. 3B, a comparison diagram of the transmittance of a glass substrate under different optical wavelengths before and after plasma treatment is shown. As indicated in FIG. 3B, the curve 33 is a transmittance curve of a glass substrate before plasma treatment, and the curves 34 and 35 are respective transmittance curves of a glass substrate after plasma treatment with the plasma gun being kept from the glass substrate at a distance of 7 mm and a distance of 5 mm. The closer the plasma gun to the substrate, the higher energy the plasma carries. As indicated in FIG. 3B, the transmittance of the glass substrate is significantly improved after plasma treatment.

Figure 3C:
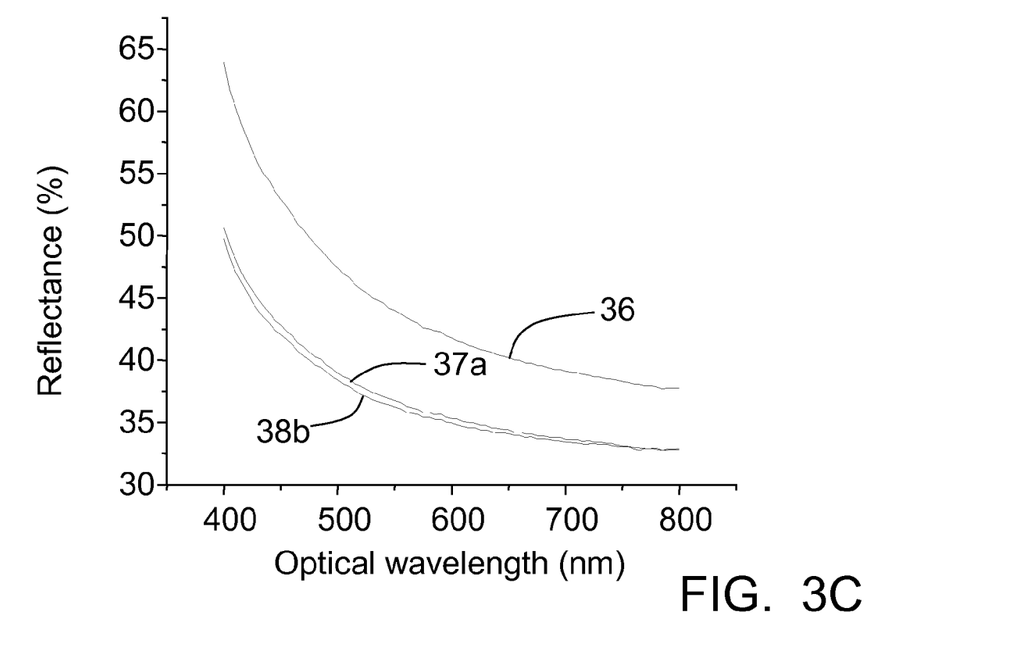
FIG. 3C is a comparison diagram of the reflectance of an unpolished silicon wafer under different optical wavelengths before and after plasma treatment.
Figure 3D:
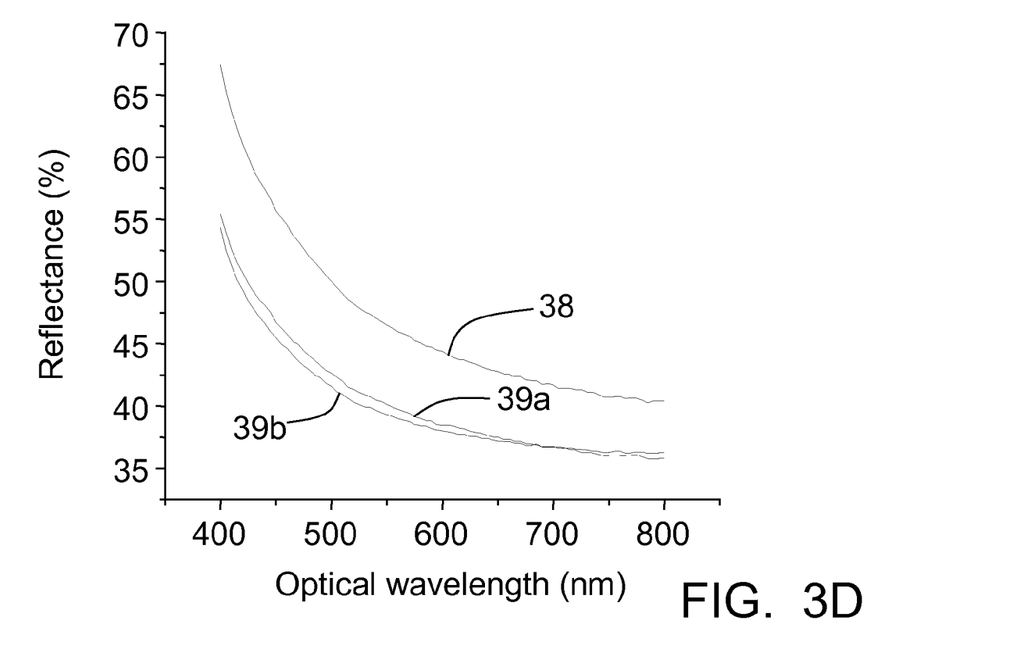
FIG. 3D is a comparison diagram of the reflectance of a polished silicon wafer under different optical wavelengths before and after plasma treatment.

Referring to FIG. 3C and FIG. 3D. FIG. 3C is a comparison diagram of the reflectance of an unpolished silicon wafer under different optical wavelengths before and after plasma treatment. FIG. 3D is a comparison diagram of the reflectance of a polished silicon wafer under different optical wavelengths before and after plasma treatment. As indicated in FIG. 3C, the curve 36 is a reflectance curve of an unpolished monocrystalline silicon wafer before plasma treatment, and the curves 37a and 37b are respective reflectance curves of an unpolished monocrystallinel silicon wafer after plasma treatment. The curve 37a and the curve 37b are respective reflectance of a monocrystalline silicon wafer after treatment with the plasma gun being kept from the monocrystalline silicon wafer surface at a distance of 6 mm and a distance of 4 mm.

As indicated in FIG. 3D, the curve 38 is a reflectance curve of a polished monocrystalline silicon wafer before plasma treatment, and the curves 39a and 39b are respective reflectance curves of a polished monocrystalline silicon wafer after plasma treatment. The curve 39a and the curve 39b are respective reflectance of a monocrystalline silicon wafer with the plasma gun being kept from the monocrystalline silicon wafer surface at a distance of 6 mm and a distance of 4 mm. As indicated in FIG. 3C and FIG. 3D, after plasma treatment, the reflectance of silicon wafer is largely reduced, and the light utilization rate of the solar collector made from the silicon wafer is largely increased.

Second Embodiment

Figure 4:
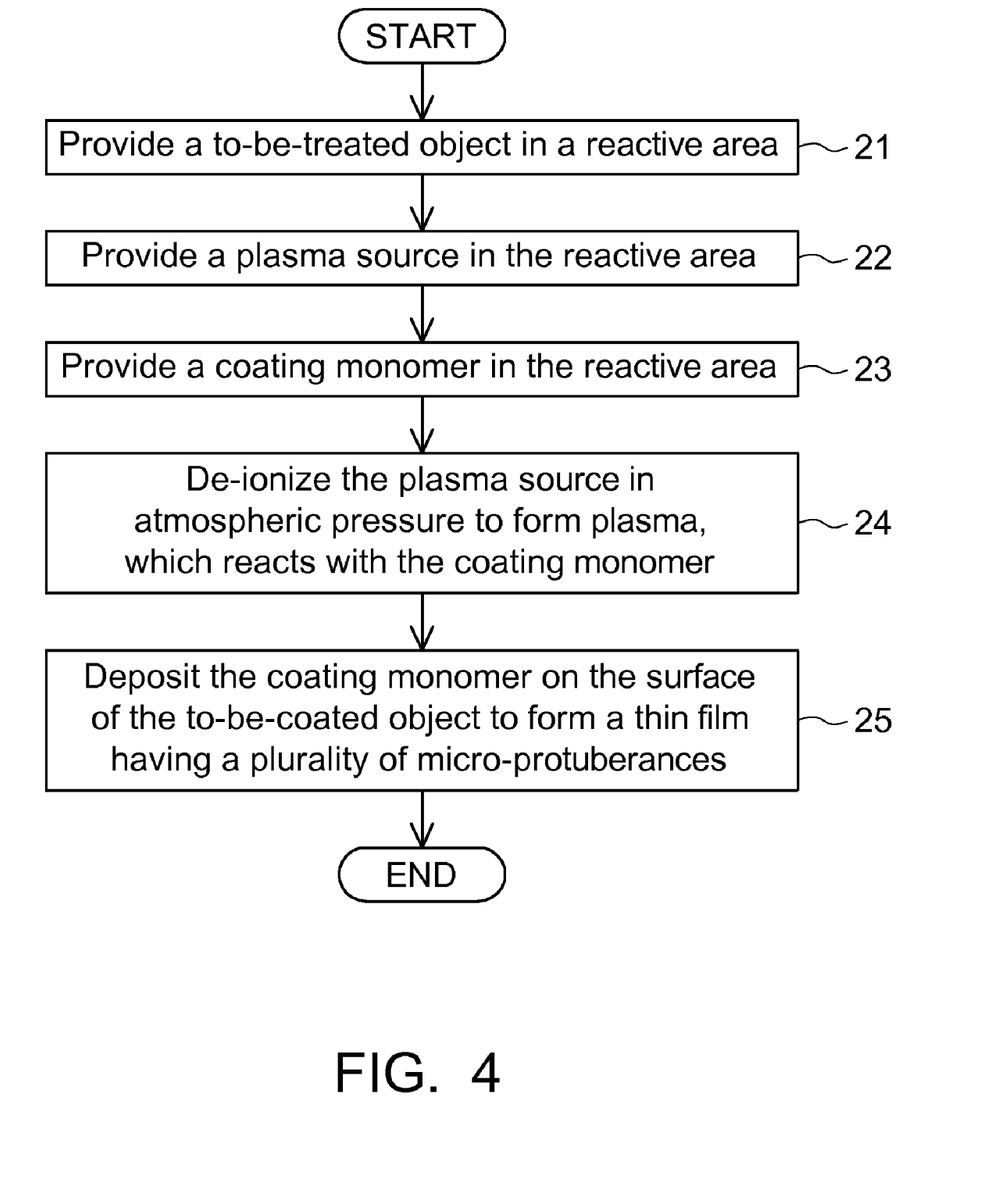
FIG. 4 is a flowchart of a forming process of an anti-reflection plate according to a second embodiment of the invention.

The anti-reflection plate of the second embodiment differs from that of the first embodiment in that the anti-reflection plate of the second embodiment forms micro-protuberances by way of atmospheric pressure plasma coating. Referring to FIG. 4, a flowchart of a forming process of an anti-reflection plate according to a second embodiment of the invention is shown. Also, referring to FIG. 5A, a diagram of a to-be-coated object and an atmospheric plasma device is shown.

Figure 5A:
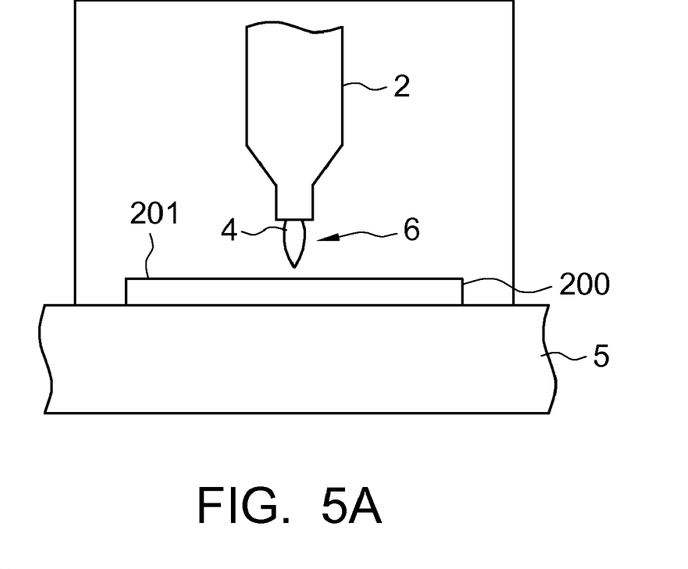
FIG. 5A is diagram of a to-be-coated object and an atmospheric plasma device.

First, as indicated in step 21, a to-be-coated object 200 is provided in a reactive area 6, wherein the to-be-coated object 200 exposing a surface 201 is placed on a platform 5 and under a plasma gun 2. In the present embodiment of the invention, the to-be-coated object 200 is exemplified by a substrate. The material of the to-be-coated object 200 is polycarbonate (PC), PMMA, silicon wafer or glass.

Next, as indicated in step 22, a plasma source is provided in the reactive area 6. The plasma source is at least one of inert gas, air, nitrogen, oxygen, chlorofluorocarbon (CFC) compound gas and hydrocarbon compounds gas. Examples of inert gas include helium, neon, argon, and krypton. The air is exemplified by clean dry air. The chlorofluorocarbon (CFC) compound gas is exemplified by carbon tetrafluoride. Hydrocarbon compounds gas is exemplified by acetylene.

Then, as indicated in step 23, a coating monomer is provided in the reactive area 6. In step 23, preferably, the coating monomer is carried to the reactive area 6 by a carrying gas. The carrying gas includes at least one of inert gas, air, nitrogen, oxygen, chlorofluorocarbon (CFC) compound gas and hydrocarbon compounds gas. The coating monomer includes at least one of silicon oxides, fluorosilicate oxides, metal oxides, saturated hydrocarbon compounds, and unsaturated hydrocarbon compounds. Examples of silicon oxides include hexamethyldisilazane (HMDSN), hexamethyldisilazane (HMDSO), and tetraethoxysilane (TEOS). Examples of fluorosilicate oxides include fluoro-alkyl-silane (FAS). Examples of metal oxides include titanium isopropoxides (TIP) and zinc nitrate (Zn $(NO_3)_2$). Examples of saturated hydrocarbon compounds, unsaturated hydrocarbon compounds include hexafluorobenzene ($C_6F_6$), carbon tetrafluoride ($CF_4$), and acetylene ($C_2H_2$).

Next, as indicated in step 24, the gas used as a plasma source is de-ionized to form the plasma 4 in atmospheric pressure for enabling the plasma 4 to react with a coating monomer. When coating monomers are disrupted by high-energy electrons or ions of the plasma into radical bases or smaller structures, the coating monomer is easier to be deposited for generating an uniform thin film.

Then, as indicated in step 25, the coating monomer deposited on the substrate surface 201 of the to-be-coated object 200 via plasma disruption is re-polymerized to form a thin film having a plurality of micro-protuberances. A silicon oxide thin film is formed if a silicon oxide or a fluorosilicate oxide is used as the coating monomer. A metal oxides thin film is formed if a metal oxide is used as the coating monomer.

A carbon thin film or a diamond-like carbon (DLC) thin film is formed if a saturated hydrocarbon compound or an unsaturated hydrocarbon compound is used as the coating monomer.

Figure 5B:
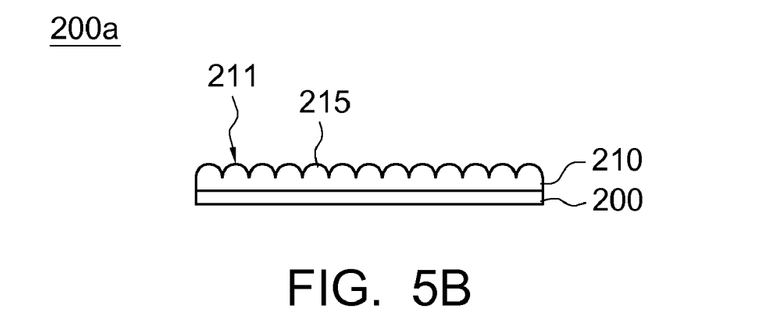
FIG. 5B is a diagram of an anti-reflection plate formed by way of atmospheric pressure plasma coating.
Figure 5C:
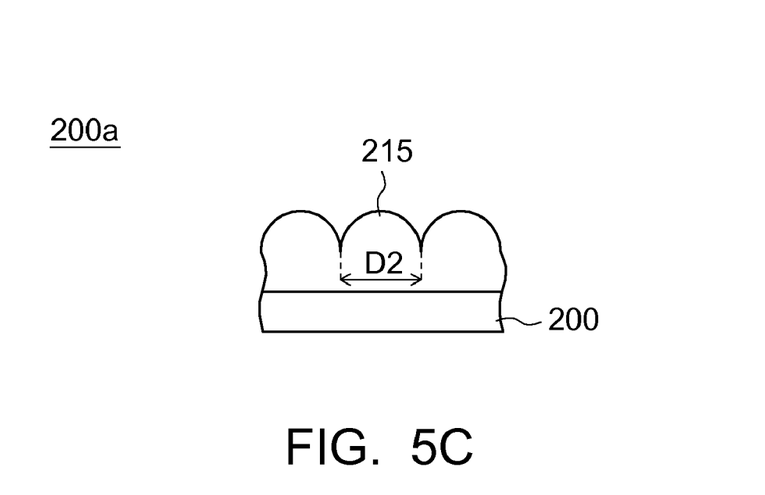
FIG. 5C is a partial enlargement of the anti-reflection plate of FIG. 5B.

Referring to FIG. 5B, a diagram of an anti-reflection plate formed by way of plasma in atmospheric pressure coating is shown. The anti-reflection plate 200a includes a single-layered anti-reflection thin film 210 formed by way of coating, and a to-be-coated object 200. The incident plane 211 of the anti-reflection thin film 210 has many periodic nanometer level micro-protuberances 215. Referring to FIG. 5C, a partial enlargement of the anti-reflection plate of FIG. 5B is shown. Preferably, the mean width D2 of individual micro-protuberance 215 is within a range from 10 nm -to 500 nm, and the roughness of the micro-protuberances 215 relative to the incident plane 211 of the anti-reflection thin film 210 is smaller than 100 nm. Similarly, in the present embodiment of the invention, roughness is measured by atomic force microscopy (AFM)

Besides, the steps 21-25 disclosed above preferably include controlling the temperature of the to-be-coated object 200. The temperature of the to-be-coated object 200 preferably is within a range from 10° C. to 100° C. so that the thin film 210 can possess better qualities.

Likewise, the steps 21-25 of the present embodiment of the invention are preferably performed in an atmospheric pressure plasma system and the sequence of the steps is not limited. The atmospheric plasma system can generate at least one of the following types of plasma such as atmospheric pressure plasma glow discharge, atmospheric pressure jet plasma, atmospheric pressure plasma torch, and atmospheric pressure surface dielectric barrier discharge.

Figure 6:
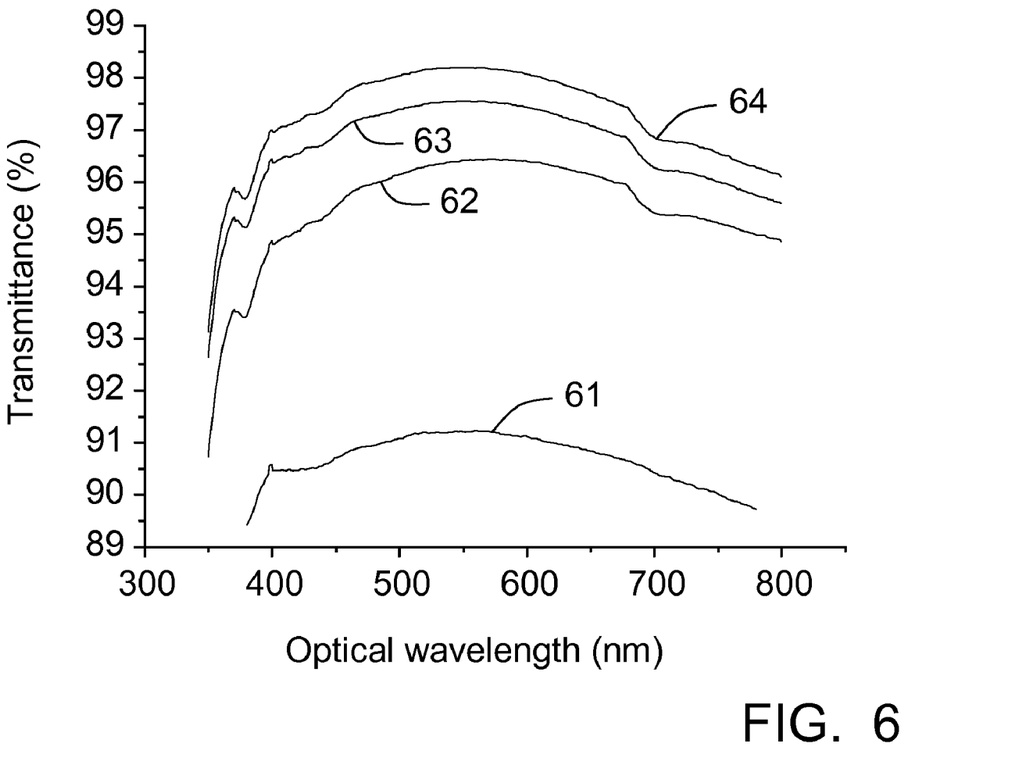
FIG. 6 is a comparison diagram of the transmittance of a glass substrate under different optical wavelengths before and after plasma coating by different coating monomers.

Referring to FIG. 6, a comparison diagram of the transmittance of a glass substrate under different optical wavelengths before and after plasma coating by different coating monomers is shown. As indicated in FIG. 6, the curve 61 is a transmittance curve of a glass substrate before the treatment of plasma coating, and the curves 62, 63 and 64 respectively are transmittance curves of a glass substrate using HMDSN, a mixed gas of hydrogen and nitrogen, and argon as the plasma source for coating the glass substrate. As indicated in FIG. 6, no matter which gas is used as the plasma source, the transmittance of a glass substrate is significantly improved after the treatment of plasma coating.

Figure 7:
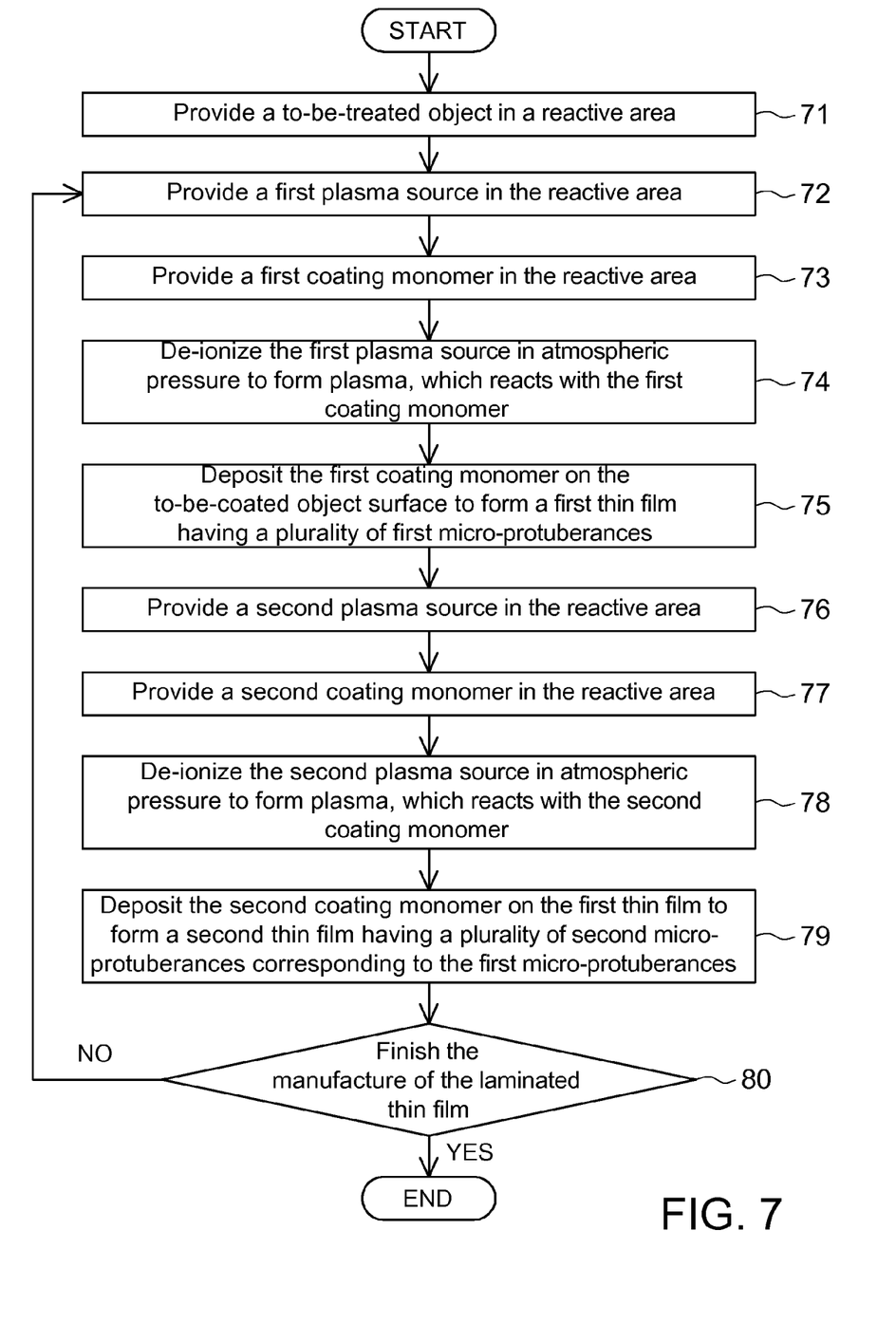
FIG. 7 is a flowchart of a forming process of a laminated thin film in the anti-reflection plate according to the second embodiment of the invention.

FIG. 7 is a flowchart of a forming process of a laminated thin film in the anti-reflection plate according to the second embodiment of the invention. The to-be-coated object and the atmospheric plasma device shown in FIG. 5A are used herein for illustration. The process of forming a laminated thin film starts from step 71, which is similar to step 41 in FIG. 4 and is not repeated herein. The material of the to-be-coated object 200 can be PC, PMMA, silicon wafer or glass. The material of the to-be-coated object 200 herein is PC, for example.

Next, as indicated in step 72, a first plasma source is provided in the reactive area 6. This step is similar to step 22 in FIG. 4 and thus is not repeated herein. According to the manner of driving the plasma source, the first plasma source can be an alternating current (AC) plasma source or a radio frequency (RF) plasma source. The first plasma source is an AC plasma source for example.

Then, as indicated in step 73, a first coating monomer is provided in the reactive area 6. This step is similar to step 23 in FIG. 4 and thus is not repeated herein. The first coating monomer includes at least one of silicon oxides, fluorosilicate oxides, metal oxides, saturated hydrocarbon compounds, and unsaturated hydrocarbon compounds.

Next, as indicated in step 74, the gas used as the first plasma source is de-ionized to form plasma in atmospheric pressure for enabling the plasma to react with the first coating monomer. This step is similar to step 24 in FIG. 4 and thus is not repeated herein.

Figure 8:
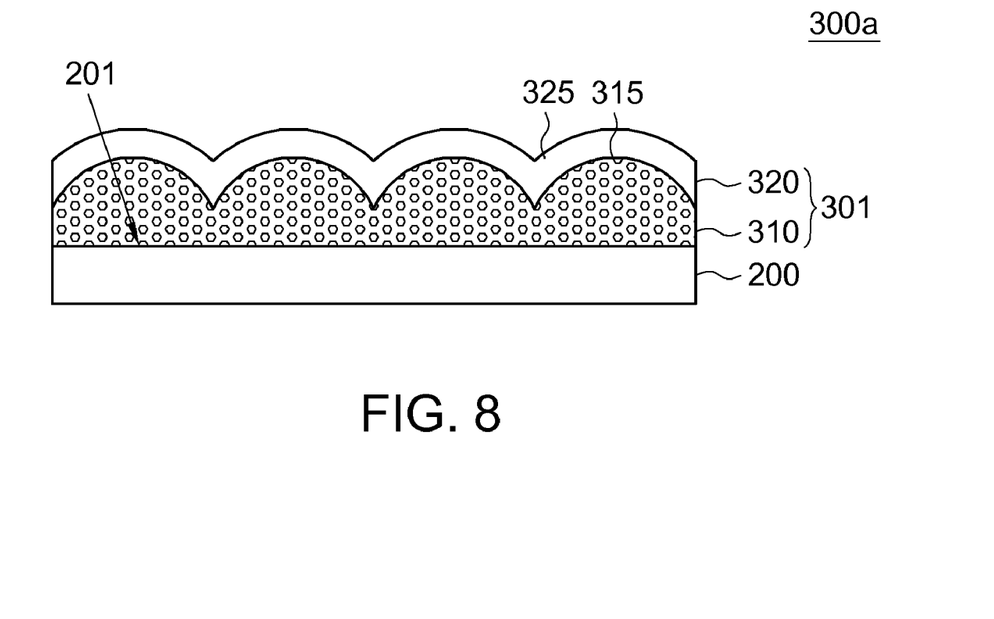
FIG. 8 is a diagram of an anti-reflection plate with a double-layer laminated thin film.

Then, as indicated in step 75, the first coating monomer deposited on the substrate surface 201 of the to-be-coated object 200 via plasma disruption is re-polymerized to form a first thin film having a plurality of first micro-protuberances. Referring to FIG. 8, an anti-reflection plate 300a with a double-layer laminated thin film is shown. As the first plasma source is AC plasma source, which forms a thin film fast and enables the structure of the first thin film to be porous. As shown in FIG. 8, the first thin film 310 is a porous structure and has a plurality of first micro-protuberances 315. The reflective index of a porous structure is lower than that of a dense structure.

A silicon oxide thin film is formed if a silicon oxide or a fluorosilicate oxide is used as the first coating monomer. A metal oxides thin film is formed if a metal oxide is used as the first coating monomer. A carbon thin film or a DLC thin film is formed if a saturated hydrocarbon compound or an unsaturated hydrocarbon compound is used as the first coating monomer.

The manufacture of a second thin film is carried out in the following. As indicated in step 76, a second plasma source is provided in the reactive area 6. The second plasma source differs from the first plasma source in the manner of driving the plasma source, and thus forms a thin structure with different characteristic. The second plasma source can be an AC plasma source or a RF plasma source. As the first plasma source is AC plasma source in the embodiment, the second plasma source is RF plasma source for example.

As indicated in step 77, a second coating monomer is provided in the reactive area 6. The material of the second coating monomer can be the same as that of the first coating monomer or not. That is, the second coating monomer includes at least one of silicon oxides, fluorosilicate oxides, metal oxides, saturated hydrocarbon compounds, and unsaturated hydrocarbon compounds.

Next, as indicated in step 78, the gas used as the second plasma source is de-ionized to form another plasma in atmospheric pressure for enabling the plasma to react with the second coating monomer.

Then, as shown in step 79 and FIG. 8, the second coating monomer deposited on the first thin film 310 via plasma disruption is re-polymerized to form a second thin film 320 having a plurality of second micro-protuberances 325 corresponding to the first micro-protuberances 315. Since the second plasma source is RF plasma source, the speed of forming a thin film is slower than that of an AC plasma source. Thus, the structure of the second thin film 320 is denser and more rigid than that of the first thin film 310, and thus is able to protect the underlayer from damage.

Preferably, the thickness of the second thin film (or the dense structure) 320 is within a range from 5 to 500 nm. The thickness of the first thin film 310 (or the porous structure) is within a range from 5 nm to 500 nm.

Afterwards, as indicated in step 80, whether the manufacture of the laminated thin film is finished is determined. If the laminated thin film 301 is predetermined as a double-layer structure, then the manufacture of the laminated thin film 301 is completed. Otherwise, the process proceeds back to step 72 to form another first thin film 310.

Figure 9:
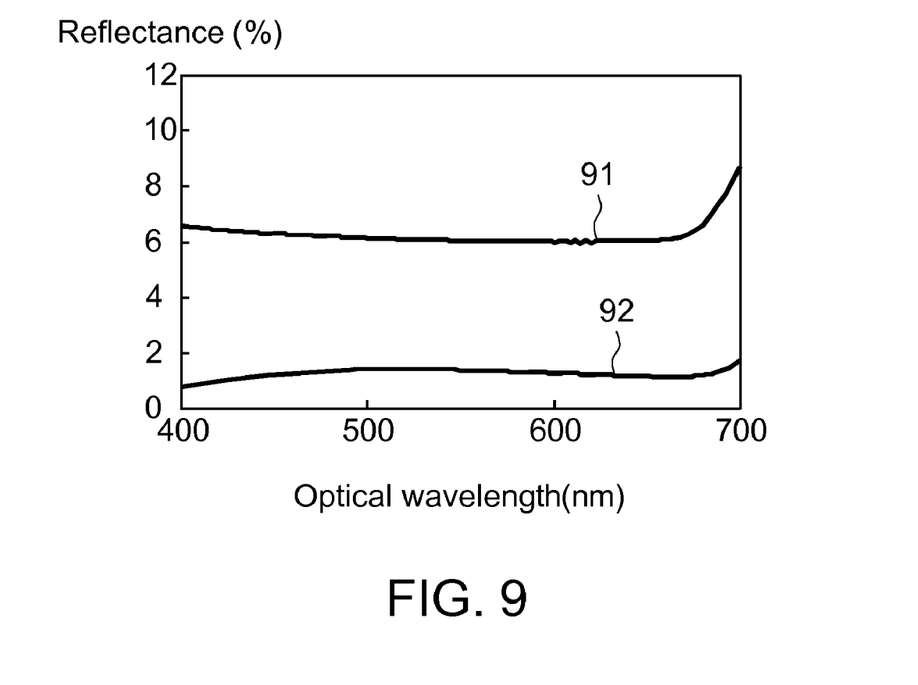
FIG. 9 is a comparison diagram of the reflectance of a PC substrate under different optical wavelengths before plasma treatment and after the double-layer anti-reflection plate is formed.

FIG. 9 is a comparison diagram of the reflectance of a PC substrate under different optical wavelengths before plasma treatment and after the double-layer anti-reflection plate 300a is formed. Curve 91 is a reflectance curve of the PC substrate before plasma treatment, and the curve 92 is a reflectance curve of the PC substrate after plasma treatment. It is observed that the reflectance of the PC substrate is largely reduced after plasma treatment.

Figure 10:
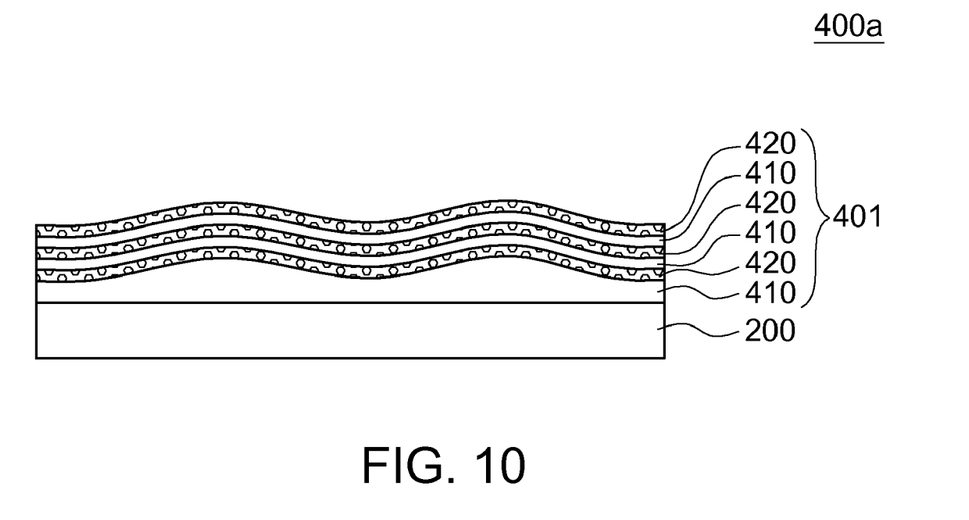
FIG. 10 is a diagram of an anti-reflection plate having a multi-layer laminated thin film.

FIG. 10 is a diagram of an anti-reflection plate 400a having a multi-layer laminated thin film. The anti-reflection plate 400a differs from the anti-reflection plate 300a in that the anti-reflection plate 400a has a laminated thin film 401 that has three first thin films 410 and three second thin films 420. The first thin films 410 and the second thin films 420 are alternately laminated on the object 200, wherein each of the first thin films 410 can be a dense structure that is formed by a RF plasma source, and each of the second thin films 420 can be a porous structure that is formed by an AC plasma source.

The thicknesses of the first thin films 410 (or the dense structure) and second thin films 420 (or the porous structure) can be the same or different. Preferably, the thickness of each thin film is within a range from 5 nm to 500 nm. The positions of the first thin films 410 and the second thin films 420 can be exchanged such that the outmost layer is the first thin film 410 that is a dense structure or a rigid layer for protecting the anti-reflection plate 400a.

Figure 11:
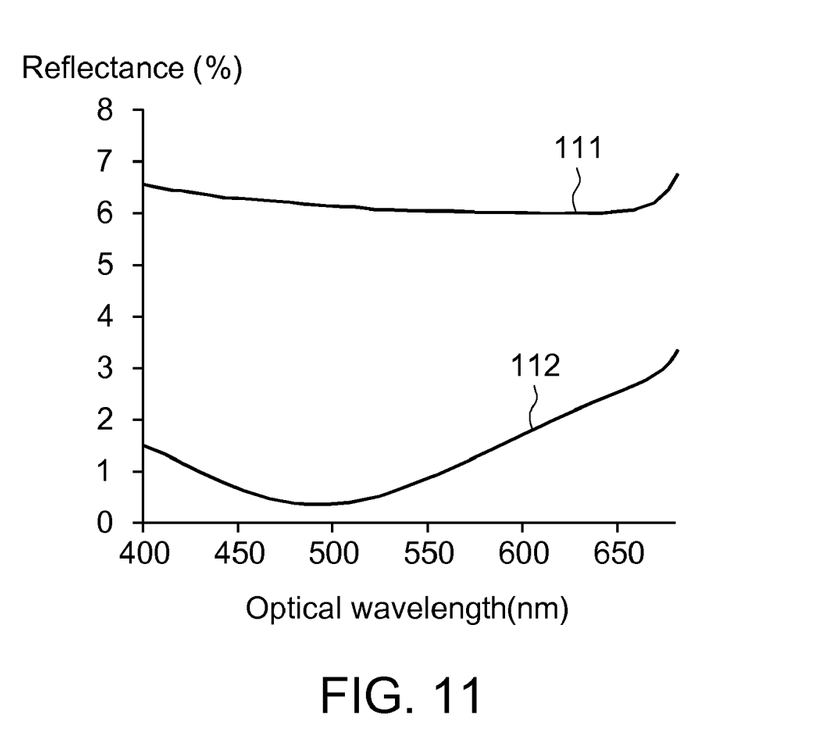
FIG. 11 is a comparison diagram of the reflectance of a PC substrate under different optical wavelengths before plasma treatment and after the multi-layer anti-reflection plate is formed.

FIG. 11 is a comparison diagram of the reflectance of a PC substrate under different optical wavelengths before plasma treatment and after the multi-layer anti-reflection plate 400a is formed. Curve 111 is a reflectance curve of the PC substrate before plasma treatment, and the curve 112 is a reflectance curve of the PC substrate after plasma treatment. It is observed that the reflectance of the PC substrate is also largely reduced after plasma treatment.

According to the anti-reflection plate and the method for manufacturing an anti-reflection structure thereof disclosed in the above embodiments of the invention, a simulated surface structure of moth eye is formed by atmospheric pressure plasma so that the occurrence of light reflectance on the display which makes the viewing of the frame difficult is reduced, and the utilization of the light is increased by increasing the percentage of incident light. The plasma manufacturing process in atmospheric pressure has the advantages of saving vacuuming time, using low-cost materials and not producing polluting substances, hence largely reducing manufacturing cost. Both the surface treatment method and the coating method are not restricted by the shapes of the object, and thus are capable of forming an anti-reflection structure on the substrate having complicated geometric shapes.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing an anti-reflection structure, comprising:
    (a) providing a to-be-treated object in a reactive area;
    (b) providing a plasma source in the reactive area;
    (c) de-ionizing the plasma source in atmospheric pressure to form plasma; and
    (d) performing plasma treatment on the surface of the to-be-treated object so as to form a plurality of micro-protuberances on the surface of the to-be-treated object.

2. The method according to claim 1, wherein the mean width of each micro-protuberance is within a range from 10 nm to 500 nm.

3. The method according to claim 1, wherein the roughness of the micro-protuberances relative to the surface of the to-be-treated object is smaller than 100 nm.

4. The method according to claim 1, wherein the plasma source comprises at least one of inert gas, air, nitrogen, oxygen, chlorofluorocarbon (CFC) compound gas and hydrocarbon compound gas.

5. The method according to claim 1, wherein the to-be-treated object is made from polymethyl methacrylate (PMMA).

6. The method according to claim 5, wherein the plasma source is argon.

7. The method according to claim 1, wherein the material of the to-be-treated object is glass or silicon wafer.

8. The method according to claim 7, wherein the plasma source is a mixed gas of argon and carbon tetrafluoride.

9. The method according to claim 1, wherein the steps (a) to (d) are performed in an atmospheric pressure plasma system.

10. The method according to claim 9, wherein the atmospheric pressure plasma system generates at least one of the following types of plasma such as atmospheric pressure glow discharge, atmospheric pressure jet plasma, atmospheric pressure plasma torch and atmospheric pressure surface dielectric barrier discharge.

11. A method for manufacturing an anti-reflection structure, comprising:
    (a) providing a to-be-coated object in a reactive area;
    (b) providing a first plasma source in the reactive area;
    (c) providing a first coating monomer in the reactive area;
    (d) de-ionizing the first plasma source in atmospheric pressure to form plasma, which reacts with the first coating monomer; and
    (e) depositing the first coating monomer on the to-be-coated object surface to form a first thin film having a plurality of first micro-protuberances.

12. The method according to claim 11, further comprising: controlling the temperature of the to-be-coated object.

13. The method according to claim 12, wherein the temperature of the to-be-coated object is within a range from 10° C. to 100° C.

14. The method according to claim 11, wherein the material of the to-be-coated object comprises at least one of PMMA, silicon wafer polycarbonate (PC) and glass.

15. The method according to claim 11, wherein the mean width of each of the first micro-protuberance is within a range from 10 nm to 500 nm.

16. The method according to claim 11, wherein the roughness of the first micro-protuberances relative to the surface of the to-be-coated object is smaller than 100 nm.

17. The method according to claim 11, wherein the first plasma source comprises at least one of inert gas, air, nitrogen, oxygen, chlorofluorocarbon compound gas and hydrocarbon compound gas.

18. The method according to claim 11, wherein the step (c), the first coating monomer is carried to the reactive area by a carrying gas.

19. The method according to claim 18, wherein the carrying gas comprises at least one of inert gas, air, nitrogen, oxygen, chlorofluorocarbon compound gas and hydrocarbon compound gas.

20. The method according to claim 11, wherein the first coating monomer comprises at least one of silicon oxides, fluorosilicate oxides, metal oxides, saturated hydrocarbon compounds and unsaturated hydrocarbon compounds.

21. The method according to claim 11, wherein the steps (a) to (e) are performed in an atmospheric pressure plasma system.

22. The method according to claim 21, wherein the atmospheric pressure plasma system generates at least one of the following types of plasma such as atmospheric pressure glow discharge, atmospheric pressure jet plasma, atmospheric pressure plasma torch and atmospheric pressure surface dielectric barrier discharge.

23. The method according to claim 11, further comprising:
    (f) providing a second plasma source in the reactive area;
    (g) providing a second coating monomer in the reactive area;
    (h) de-ionizing the second plasma source in atmospheric pressure to form another plasma, which reacts with the second coating monomer; and
    (i) depositing the second coating monomer on the first thin film to form a second thin film having a plurality of second micro-protuberances corresponding to the first micro-protuberances.

24. The method according to claim 23, wherein the manner of driving the first plasma source is different from that of the second plasma source.

25. The method according to claim 24, wherein the first plasma source is an alternating current plasma source or a radio frequency plasma source.

26. An anti-reflection plate having an incident plane, the anti-reflection plate comprises a plurality of micro-protuberances disposed on the incident plane, wherein the mean width of each micro-protuberance is within a range from 10 nm to 500 nm.

27. The anti-reflection plate according to claim 26, wherein the roughness of the micro-protuberances relative to the incident plane is smaller than 100 nm.

28. The anti-reflection plate according to claim 26, wherein the material of the anti-reflection plate comprises at least one of glass, silicon wafer, PC and PMMA.

29. The anti-reflection plate according to claim 26, wherein the anti-reflection plate further comprises:
    a substrate; and
    a single-layered thin film disposed on the substrate, wherein the single-layered thin film has the micro-protuberances.

30. The anti-reflection plate according to claim 26, wherein the anti-reflection plate further comprises:
    a substrate; and
    a laminated thin film disposed on the substrate, wherein the laminated thin film at least has a first thin film and a second thin film for forming the micro-protuberances, the first thin film is disposed between the substrate and the second thin film, and a reflective index of the first thin film is not the same as that of the second thin film.

31. The anti-reflection plate according to claim 30, wherein the structure of the first thin film is a porous structure or a dense structure.

32. The anti-reflection plate according to claim 31, wherein the thickness of the dense structure is about one-fourth the wavelength of a light source to which the anti-reflection plate is applied.

33. The anti-reflection plate according to claim 31, wherein the thickness of the porous structure is within a range from 5 nm to 500 nm.

34. The anti-reflection plate according to claim 30, wherein the material of the first thin film comprises at least one of silicon oxides, fluorosilicate oxides, metal oxides, saturated hydrocarbon compounds and unsaturated hydrocarbon compounds.

* * * * *